April 10, 1934.  D. WORTMANN  1,954,581
STORAGE TANK
Filed Feb. 15, 1932  2 Sheets-Sheet 1
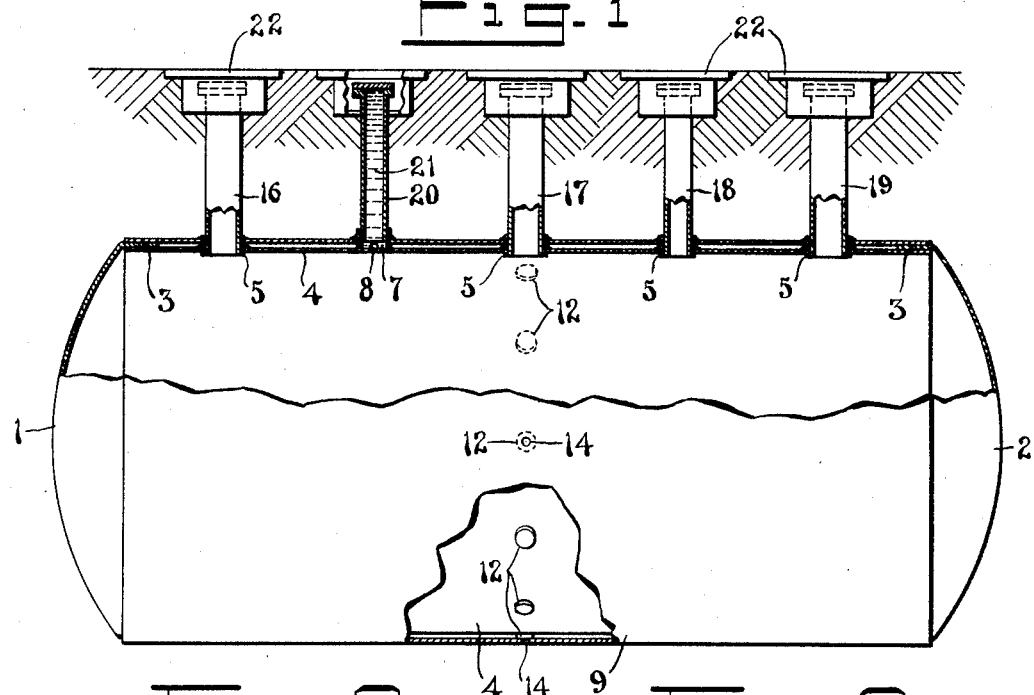
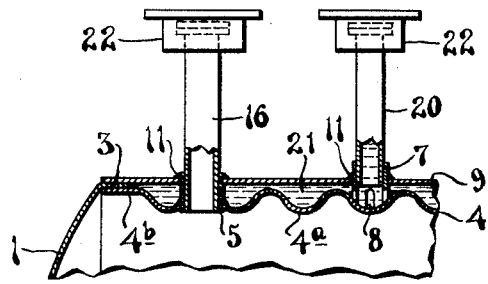
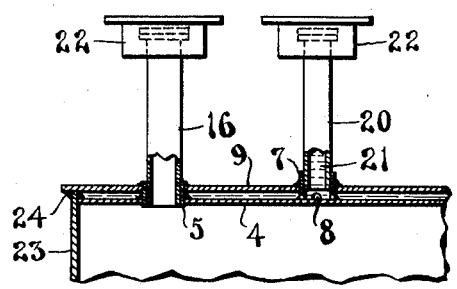
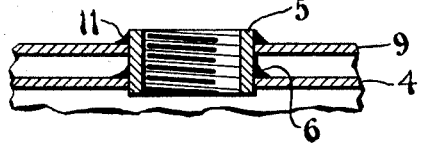
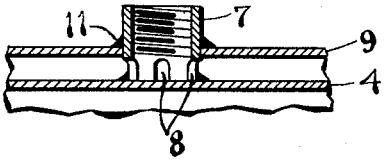
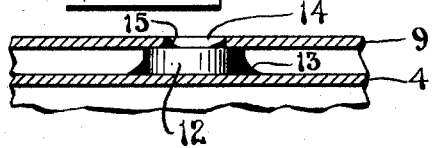
INVENTOR
Dietrich Wortmann
BY
ATTORNEY April 10, 1934.  D. WORTMANN  1,954,581
STORAGE TANK
Filed Feb. 15, 1932  2 Sheets-Sheet 2
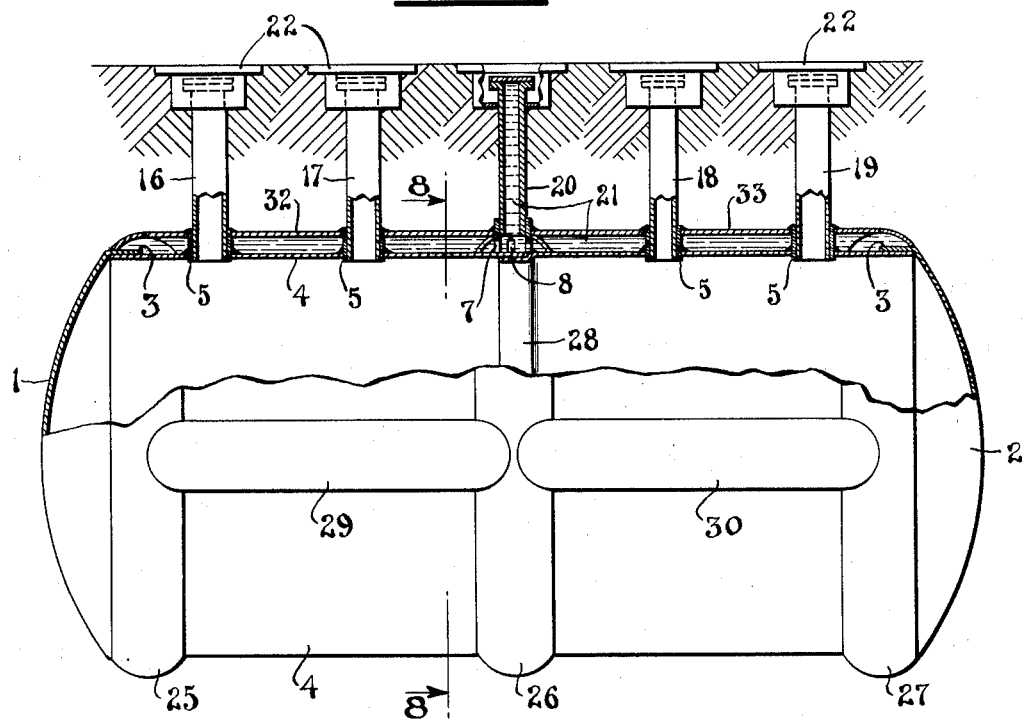
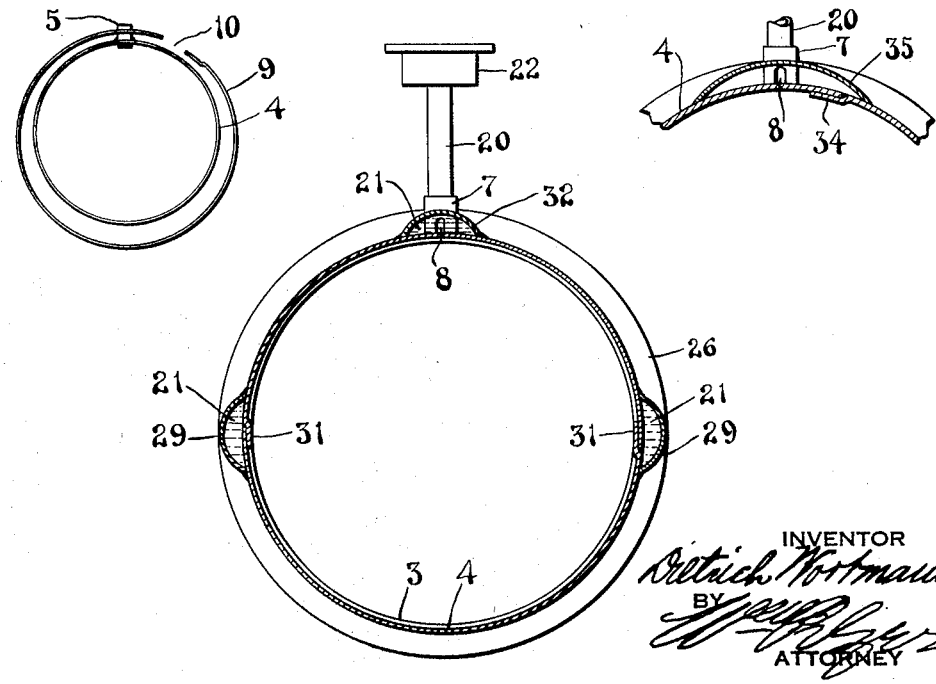

Patented Apr. 10, 1934

1,954,581

UNITED STATES PATENT OFFICE 1,954,581

STORAGE TANK

Dietrich Wortmann, Brooklyn, N. Y.

Application February 15, 1932, Serial No. 593,132

9 Claims. (Cl. 220—14)

This invention relates to storage tanks for fluids such as fuel oil, gasoline and other liquids, for installation in or adjacent to buildings, such as private homes, apartment houses, factories, automobile service stations, etc., and more especially to storage tanks for use in localities where such tanks are required to be placed underground, and to tanks located in places not readily accessible for inspection and the detection of leaks.

Tanks for this purpose are commonly made of boiler iron or tank steel of suitable gauge, and generally are required to be enclosed in vaults or encased in concrete underground. I have discovered that in such tanks leaks are caused, not only by corrosion, but in many cases leaks occur at seams and joints due to sudden shock, or strain resulting from vibration, and other causes. Leaks occurring in such enclosed tank are not readily discovered, and the confinement of gas in such enclosures and the slow seepage into the surrounding vaults and earth adjacent the buildings, subways, sewers or wells, may result in contamination and serious explosions, fire damage and loss of life.

In my application for patent filed January 16, 1931, Serial No. 509,210, granted Nov. 1, 1932, Patent No. 1,886,074, I have disclosed a safety storage tank designed to overcome the danger from leaks in ordinary single shell underground or concrete encased storage tanks, and my present invention is an improvement over the tank structure shown and described in that application, and is mainly designed to produce a rigid jacketed tank of simple design in which the danger from leaky seams and joints due to vibration, shock or distortion will be reduced to a minimum, and in which all seams and joint will be covered by a detector fluid by means of which leaks may be readily and promptly observed, and in which the danger due to corrosion is practically eliminated, and at the same time reducing the weight of such tanks and affording pipe connections less liable to fracture at the tank due to bending or buckling of the plates or pipes.

In carrying this invention into effect I produce a tank having ends or heads of single thickness and a body provided with an additional shell covering all seams and joints, and the space between the tank and additional shell being filled with a leak detector fluid. I also use bonding plates between the tank and outer shell which provide rigid bonds at desired points for holding the tank and outer shell in fixed spaced relation and greatly increasing the strength and rigidity and at the same time permitting considerable reduction in the weight of the tank. I also provide one or more pipes for communicating with the space between the tank and protecting shell for introducing the detector fluid thereto and serving also as indicator pipes in which a drop in the level of the fluid will indicate the presence of a leak in the tank. I also provide the usual service pipe connections, and all pipe connections or fittings therefor are made rigid and fixed relative to the tank, preferably by welding to both the tank and protecting shell, and thereby providing a two-point anchorage for fittings which prevents dis-jointing of the fittings due to lateral strain. These and other features designed to prevent straining or opening of seams and joints due to strain, vibration, expansion or shock, and my method of building up the tank, are more fully hereinafter described in detail in connection with the drawings.

My invention is illustrated in the accompanying drawings, in which Figure 1 is an elevation and partial section of a tank with protecting shell and pipe connections; Figure 2 a sectional view illustrating a modification in which the inner shell of the tank is made of corrugated metal; Figure 3 a sectional view illustrating another modified form in which flat tank ends or heads are employed; Figures 4 and 5 are sectional views showing the pipe connections to the tank and protecting shell; Figure 6 a sectional view illustrating the bonding plate between the tank and protecting shell; Figure 7 an elevation and partial section of a tank provided with a modified form of protecting shell; Figure 8 a vertical section on the line 8—8 of Figure 7; Figure 9 a similar section showing another detail; and Figure 10 a schematical illustration of the method of assembling the cylindrical shells.

Referring to the drawings, 1 and 2 indicate the cylinder or tank heads, which as shown are preferably convex or full-dished outward, and both heads are provided with a cylindrical flange 3. Closely fitted within flanges 3 is the inner tank cylinder 4, as shown in the sectional part of Figure 1, and secured fluid-tight by continuous welding around the entire circumference. This cylinder may be formed with any desired number of plates or sections, but all seams and joints will be covered by the protecting shell and detector fluid. Cylinder 4 will be provided with the necessary number of holes of appropriate size for service pipe and other connections for the inner tank, four being shown, and preferably all in alignment. Into these holes are inserted sleeves or fittings 5 which are welded to the shell 4 with a complete circumferential weld as shown by the heavy shading 6 in Figure 4. A fitting 7 is seated on the shell 4, preferably in alignment with the fittings 5, and this fitting is provided with holes or slots as shown at 8 in Figure 5. This fitting may be completely welded to the shell 4 or spot welded thereto. The purpose of holes or slots 8 is to effect communication with the space between the two shells. After the pipe fittings 5 and 7 are in place the outer protecting shell 9 is placed in position. My method of accomplishing this is to first form the shell into a split cylinder having the proper number and size holes to fit the fittings 5 and 7. This cylinder may be made of any desired gauge metal and number of plates, either riveted or welded together and is formed into cylindrical shape, but left unjointed preferably along a straight longitudinal line, thus forming a split cylinder. Shell 9 before it is closed over shell 4 is large enough in diameter to permit shell 4 with its fittings 5 and 7 and heads 1 and 2 to pass into it so that when the holes in shell 9 are in alignment with the fittings 5 and 7 shell 9 may be lowered so as to rest on head-flanges 3 with fittings 5 and 7 projecting through the holes in shell 9 which is then drawn into close contact with head-flanges 3, and the gap 10 (Figure 10) closed either with the edges of the shell abutting or overlapping. This may be accomplished in various ways as for instance by the use of band clamps. When shell 9 is properly closed and fitted to the head-flanges, the longitudinal butt or lap joint will be completely welded, then the ends of cylinder 9 will be completely welded to the head-flanges, and then the fittings 5 and 7 will be completely welded to the shell 9 as illustrated by the heavy shading 11 in Figures 4 and 5. This will complete the tank consisting of the inner shell, protecting shell, pipe fittings, single wall heads, and space between the shells for receiving the protecting and detector fluid.

In tanks where greater strength and rigidity are required, or for tanks of relatively long length, I provide bonding plates 12 which may be placed in one or more rows circumferentially, longitudinally or otherwise, between the two shells, a single circumferential row being shown in Figure 1. These plates are preferably welded, either by complete or spot welding to the cylinder 4, as shown by heavy shading 13 in Figure 6, although they may be firmly or rigidly attached in an other suitable manner. The outer shell is provided with holes 14 which will register with the plates 12, and after shell 9 is in final position over shell 4 and secured to the head-flanges, shell 9 will be bonded to shell 4 by complete welding between shell 9 and plates 12 as shown by heavy shading 15 in Figure 6.

To the fittings 5 will be connected pipes 16, 17, 18, and 19 which are, respectively, the filling, gauging, vent and suction pipes for the tank, and it will be observed that the bending or buckling, or lateral straining of these pipes will not cause canting of the fittings 5 because the two point attachment and anchoring of the fittings between shells 4 and 9 will resist any canting movement relative to the shells, and hence no leak will occur at these joints due to such cause. Pipe 20 is connected to the fitting 7 which communicates through holes or slots 8 with the space between the shells and serves as the supply pipe for the protecting and detector fluid 21 indicated by the broken lines in Figures 1, 2 and 3. Fitting 7, like fittings 5, being attached at two points and anchored between shells 4 and 9 will resist canting and hence prevent a leak occurring between that fitting and shell 9. Each of the pipes 16 to 20 inclusive are shown as provided with a service box 22 which may be of any approved type and these boxes, since they form no part of the present invention, are illustrated schematically. Vent pipe 18 is not usually provided with a service box for the reason that generally this pipe is run up to a suitable height above ground to discharge gas formed in the tank.

The detector fluid 21 is preferably a dark oil or other colored fluid readily observable and distinguishable from the color of the liquid carried in tank 4, and is supplied to the jacket space through the detector pipe 20. This fluid is filled in to a definite level readily observable in pipe 20, it being shown in the drawings flush at the cap in the service box 22. This fluid will also be such as to serve as a preservative or protection against corrosion. If a leak occurs in either shell of the tank the leakage of the detector fluid may be immediately detected by the change in the fluid level in the detector pipe 20, and also by the discoloration of the liquid in tank 4 if the leak occurs in that tank.

In Figure 2 is illustrated a tank constructed in accordance with my improved method, but having an inner shell 4 of corrugated metal. The corrugations 4$^a$ extend lengthwise of the shell and at each end is a cylindrical flange or rim 4$^b$ fitting within head-flange 3 and to which it is welded as in the arrangement of Figure 1. It will be noted that the corrugations 4$^a$ are all inward so that the diameter of the corrugated shell does not exceed the diameter of rim 4$^b$ and therefore does not interfere with the circulation of fluid 21. The corrugated shell is perforated and provided with fittings 5 and a fitting 7 is likewise welded to the shell but is preferably seated in the trough of a corrugation to give ample space for the holes or slots 8 in that fitting. The outer shell 9 will be cylindrical as in Figure 1, and the method of assembly and application of fittings will be the same. This construction is of value in cases where there is danger of sudden heating of the outer shell of the tank, the corrugated inner shell allowing for longitudinal expansion, especially in long tanks, thereby avoiding the possible rupture of circumferential joints or seams. This design also adds greatly to the strength of the shell when subjected to loads from the outside.

In Figure 3 is illustrated a tank construction similar to Figure 1, except that a flat disk head 23 is employed instead of the dished form. In this arrangement, which is more suitable for small tanks, the inner shell 4 may be plain cylindrical or corrugated, but the edge of the shell (which is smaller in diameter than the disk 23) is welded to the face of the disk by complete circumferential welding, and the outer shell 9 having the same diameter as the disk 23 projects preferably beyond the outer face of the disk as shown and is likewise welded thereto as indicated by the heavy shading 24. Shells 4 and 9 in this form are perforated for fittings 5 and 7 the same as in Figure 1, and the method of assembly and application of the fittings will be the same, and in both arrangements of Figures 2 and 3, bonding pieces or plates 12 may be employed if desired.

In Figures 7, 8 and 9 is illustrated another form of my invention for protecting the seams and joints of a tank and for employing a detector fluid for disclosing the presence of a leak. In this form instead of a complete protecting shell for the entire tank body, I employ a number of small shells or ducts for covering the seams and joints only, and part of these ducts encircle the tank to cover the circumferential seams and joints between the body and heads, and similar straight shells or ducts extend over the longitudinal seams. All of these ducts may be interconnected as shown to permit circulation of the detector fluid for use with a single detector tube, or the ducts may be arranged independently for each seam and each having a detector tube whereby a leak at any one seam may be detected. For the purpose of illustration, I have shown in Figure 7 three circumferential ducts 25, 26 and 27, and three longitudinal ducts made up of sections 29, 30, 32 and 33, all shown inter-connected, and semi-circular in cross-section, although any other suitable form may be employed. These ducts cover the circumferential joints between the head-flanges 3 and shell 4 and mid-section seam 28. Extending between these ducts on opposite sides of the tank are ducts 29 and 30 which cover the two longitudinal seams 31, see Figure 8, and extending along the upper center line of the tank between ducts 25, 26 and 27 are ducts 32 and 33. The longitudinally extending ducts are fitted into and joined, preferably by welding, to the circumferential ducts so as to permit complete circulation of the detector fluid 21 in covering all seams and joints. In tanks of ordinary size a single longitudinal seam is employed, and in such tanks the seam is usually near the top center line, but sufficiently removed so as not to be pierced by the holes for the pipe fittings. This is illustrated in Figure 9 where longitudinal seam 34, which may be either a lap or butt seam, is shown to the left of the center line, and the longitudinal duct 35 is made sufficiently wide to overlap the seam. In this arrangement the same fittings 5 and 7 are employed as in the other forms of my improved tank and as shown in Figures 7, 8 and 9 of the drawings, both fittings are welded to the shell 4 in the same manner as above described, and fitting 7 is provided with holes or slots 8 for permitting communication between the ducts and detector pipe 20. Shells 32 and 33 are provided with holes which are fitted over the fittings 5 and 7 and these shells are completely welded to the circumferential ducts 25, 26 and 27 into which they are fitted, and completely welded along both edges to the shell 4 and to the fittings. Thus the shells are welded fluid-tight to the tank shell 4 and to the fittings, and the fittings are rigidly attached at two points to prevent canting as above described, and the shells will serve to strengthen the tank body very materially. These shells will serve especially to strengthen the seams and joints as will be evident by reference to Figures 8 and 9 of the drawings where the shells 29 and 35 act as bracing arches overlapping the seams and joints by reason of their being rigidly attached to the tank shell 4 on both sides of and parallel to the entire length of the seam or joint.

From the foregoing description it will be observed that I produce a tank having heads of single thickness, that is, without a jacket space, and due to the method of construction, the jacket space surrounding the inner shell is materially reduced and hence the outer shell will be correspondingly reduced in size, and that owing to the manner of welding the two shells to the cylinder heads and the bonding of the two shells at points intermediate the heads by both the bonding plates and the fittings, a rigid construction is obtained which permits of a reduction in the gauge of metal employed and consequently a considerable reduction in the weight of the complete tank without decreasing the efficiency of the protection afforded by the protecting shell or the functioning of the protecting and leak detecting functions of the fluid in the jacket space. And furthermore I provide supply and service connections which are relatively inexpensive, occupy less space, are less liable to leak, avoiding all packing glands, and requiring no adjustments after installation.

What I claim is:—

1. A storage tank for fluids having in combination, two single-walled heads, a double-walled body held in spaced relation by and secured fluid-tight to said heads, the space between the walls of the body being adapted to hold a detector fluid, a pipe passing fluid-tight through the outer wall of the body and rigidly attached to both walls and communicating with the space between said walls for supplying the detector fluid and serve as an indicator pipe for indicating leakage from said space, and supply and service connections passing through and rigidly attached fluid-tight to both walls.

2. A storage tank for fluids, having in combination, two heads each having a cylindrical flange, a tank body formed of two spaced shells mounted between said heads, one supported within the head-flanges and secured fluid-tight thereto, and the other supported on the outside of the head-flanges and similarly secured thereto, an indicator pipe passing fluid-tight through the outer shell and rigidly attached to both shells and communicating with the space between said shells for supplying a detector fluid thereto and for indicating by the variation of the fluid level in said pipe the existence of a leak into or from either of said shells, and supply and service connections passing through and secured fluid-tight to both shells.

3. A storage tank for fluids, having in combination, two dished heads having cylindrical flanges, a cylindrical shell fitted to the interior of said flanges and welded thereto with a complete circumferential weld, a second cylindrical shell fitted to the exterior of said flanges and similarly welded thereto, an indicator pipe passing fluid-tight through the outer shell and rigidly attached to both shells and communicating with the space between said shells for supplying a detector fluid thereto and for indicating by the variation of the fluid level in said pipe the existence of a leak into or from either of said shells, and supply and service connections passing through and secured fluid-tight to both shells.

4. A storage tank for fluids having in combination, two single-walled heads, a body consisting of two shells held in spaced relation by and secured fluid-tight to said heads and the inner shell being corrugated to permit longitudinal expansion and contraction, and the space between said shells being adapted to hold a protecting and leak detecting fluid, a pipe passing fluid-tight through the outer shell and rigidly attached to both shells and communicating with the space between said shells for supplying the said fluid and serving as an indicator pipe for indicating leakage from said space, and supply and service connections passing through and secured fluid-tight to both shells.

5. A storage tank for fluids, having in combination, two single-walled heads each having a cylindrical flange, a tank body consisting of two shells, the inner shell being corrugated to permit longitudinal expansion and contraction and having cylindrical ends fitting within the head-flanges and secured fluid-tight thereto, and the outer shell fitting over the exterior of said head-flanges and similarly secured thereto, and the space between said shells being adapted to contain a protecting and leak detecting fluid, a pipe passing fluid-tight through the outer shell and rigidly attached to both shells and communicating with the space between said shells for supplying said fluid and serving as an indicator pipe for indicating leakage from said space, and supply and service pipe connections passing through and secured fluid-tight to both shells.

6. A storage tank for fluids, having in combination, two single-walled heads each having a cylindrical flange, a tank body consisting of two shells, the inner shell being corrugated to permit longitudinal expansion and contraction and having cylindrical ends fitting within the head-flanges and welded thereto by a complete circumferential weld, and the outer shell fitting over the exterior of said head-flanges and welded thereto in like manner, and the space between said shells being adapted to contain a protecting and leak detecting fluid, a pipe passing fluid-tight through the outer shell and rigidly attached to both shells and communicating with the space between said shells for supplying said fluid and serving as an indicator pipe for indicating leakage from said space, and supply and service pipe connections passing through and secured fluid-tight to both shells.

7. A storage tank for fluids, having in combination two heads of single thickness, a tank body welded fluid-tight thereto, a protecting shell welded in position to cover all seams and joints and providing jacketed spacing adapted to contain a leak detector fluid, a pipe passing through the protecting shell and welded to both the shell and tank body and communicating with said space for supplying such fluid and indicating leakage from said space, and supply and service connections passing through both the protecting shell and tank body and welded fluid-tight thereto.

8. A storage tank for fluids having a body consisting of inner and outer shells adapted to contain a fluid in the space between said shells, small plates welded at intervals to the exterior of the inner shell, perforations in the outer shell of less area than said plates and so located that as the shells are placed in position one within the other, the plates will cover and overlap said perforations, and welds between the exposed parts of said plates and the walls of said perforations, whereby said perforations are sealed fluid-tight and said inner and outer shells are bonded together and the shells held in spaced relation and without obstructing fluid circulation in said space.

9. A storage tank for fluids having in combination two heads of single thickness, a tank body secured fluid-tight thereto, a protecting shell welded in position to cover all seams and joints and providing jacketed spacing adapted to contain a leak detector fluid, a pipe passing through the protecting shell and welded fluid-tight thereto and communicating with said space for supplying fluid to said space and indicating leakage therefrom, and nipples adapted to receive supply and service pipes welded fluid-tight in perforations in the tank-body and registering with and passing through perforations in the protecting shell and welded fluid-tight thereto.

DIETRICH WORTMANN.